A. Whiteley,
Mower
No. 25,291  Patented Aug. 30, 1859.
Sheet 3, 3 sheets.
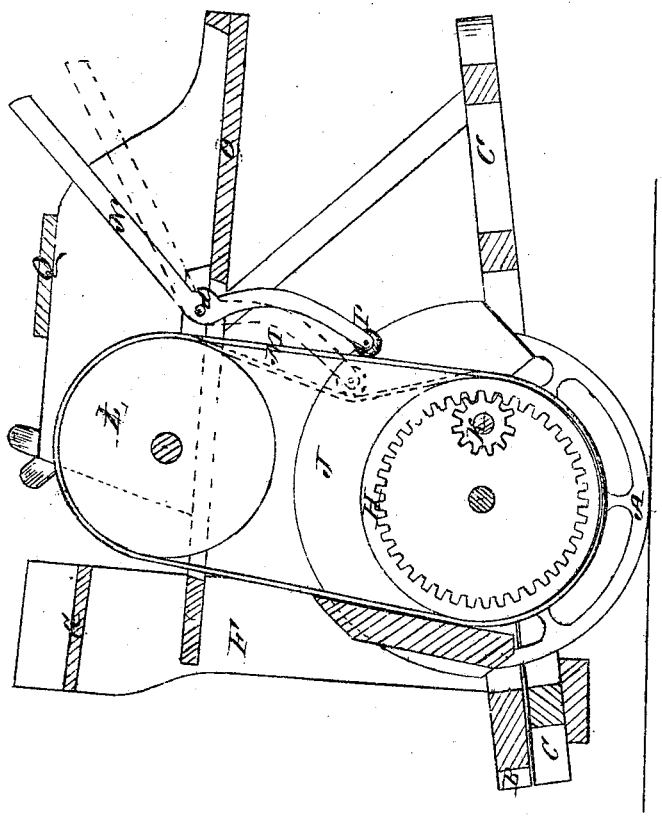
Fig. 3 Vertical Section at X X fig 1.
Fig. 4 Cross Section at A.A.

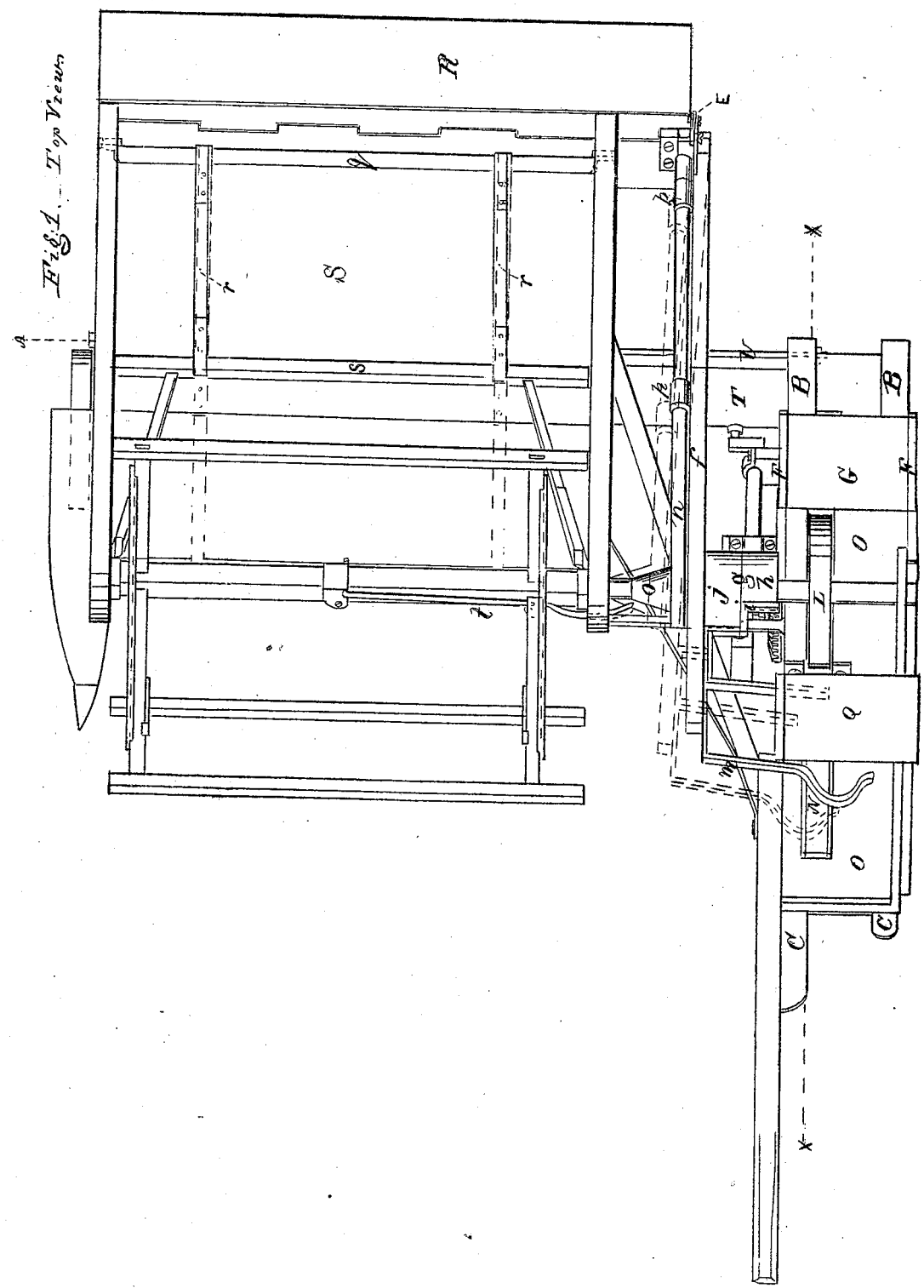

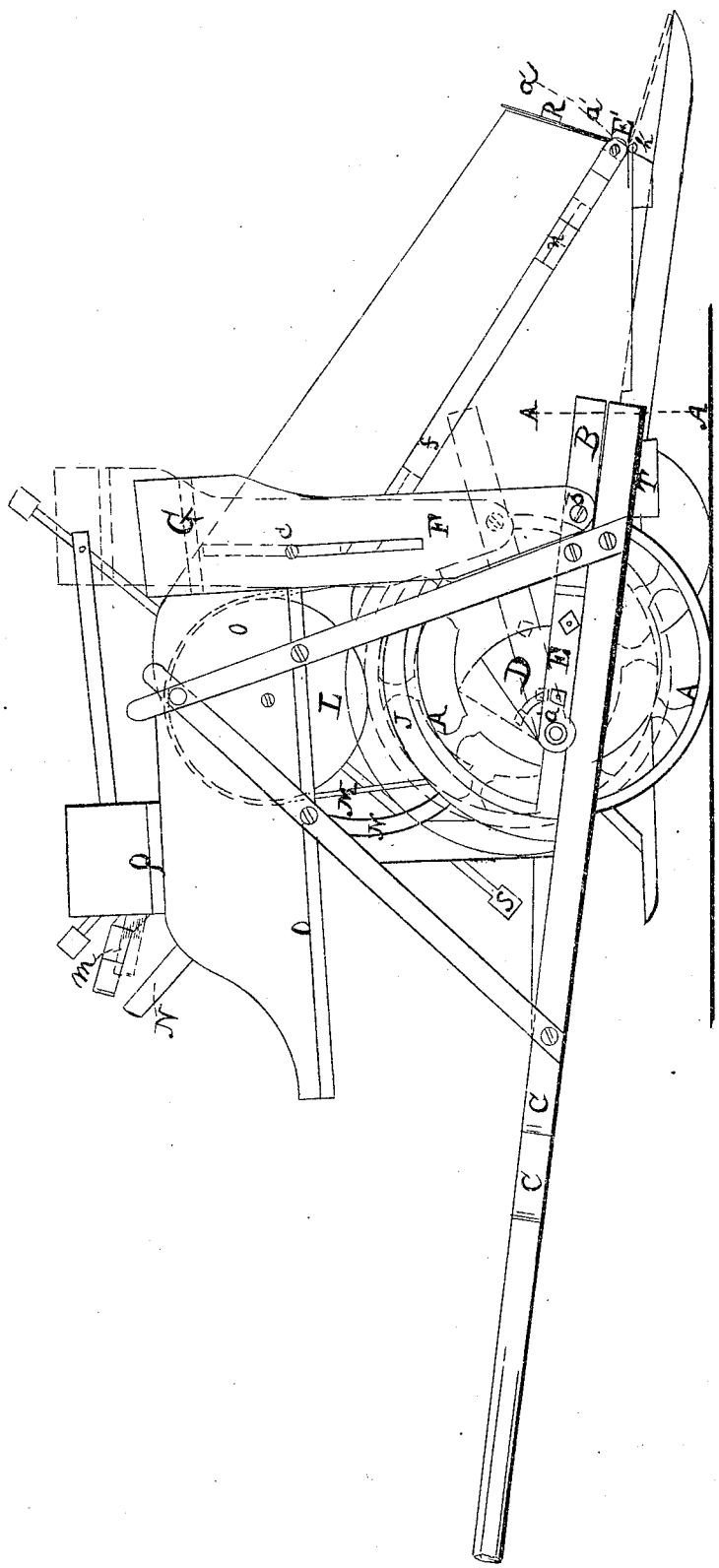
A. Whiteley.
Mower.
No. 25,297.    Patented Aug. 30, 1859.
Fig. 3. Side Elevation.

UNITED STATES PATENT OFFICE.

ABNER WHITELEY, OF SPRINGFIELD, OHIO.

IMPROVEMENT IN HARVESTERS.

Specification forming part of Letters Patent No. 25,297, dated August 30, 1859.

*To all whom it may concern:*

Be it known that I, ABNER WHITELEY, of Springfield, in the county of Clarke, in the State of Ohio, have invented new and useful Improvements in Harvesting-Machines; and I do declare that the following is a full, clear, and exact description thereof, reference being had to the accompanying drawings, and to the letters of reference marked thereon.

My invention consists in the provision of certain means, hereinafter described, to prevent scattering the grain upon the ground between the gavels during the progress of the machine. I hinge a door or shutter to the rear edge of the platform, and connect it by a suitable rod extending to the front of the machine, near the driver's seat. This door is held closed when the grain is accumulating upon the platform in a quantity sufficient for a gavel, when it is discharged, the door or shutter turning upon its hinges at the proper time, and immediately closing again to avoid scattering the grain between the gavels. The door or shutter is also so arranged with suitable mechanism as to admit of being retained in its closed position for longer periods of time when the machine i harvesting grain that is thin or light upon the ground than when the crop is heavy.

To enable those skilled in the art to make and use my improvements, I will now proceed to describe the several features of my invention as I have practiced them, referring by letters and figures to the accompanying drawings, forming part of this specification, in which—

Figure 1 is a top plan view. Fig. 2 is a side elevation. Fig. 3 is a vertical section on $x\ x$, Fig. 1. Fig. 4 is a section through platform-frame, showing brace-rod.

A is the ground-wheel, hung in the frame B B', which is connected to the main frame C by a flexible joint at $a$.

D D' are plates bolted on the insides of frame B B', and form the boxes for the master-wheel shaft on their inner surface, and have holes in their front ends, which fit on lugs to form part of said flexible joints, while plates E E being bolted on the outside of said frame, and having holes in their front ends similar to those in plates D D', and fit on lugs on the opposite sides from D D', thus making a joint of sufficient strength to support the ground-wheel and retain the driving-gear wheel in gear when running, without any other connection with the main frame C.

F F are upright pieces, which support the driver's seat G between them, and are pivoted to the frame B B' at $b$, and have slots in them which permit them to ascend and descend, while they are held in their upright position by means of pins or screws $c\ c$, which pass through said slots into the foot-board. This ascending and descending is caused by the unevenness of the surface over which the ground-wheel A passes.

H is the driving cog-wheel, as shown in Fig. 3, and is cast or bolted onto the ground-wheel A, and stands out from the plane of the ground-wheel, and there is a groove in between those two wheels, into which the plate J is fitted. This plate is used to prevent the dirt or mud getting onto the outside or periphery of H, which is used for a driving-pulley to drive the reel and rake $q$, and also prevents the same getting into the cogs on its internal surface, which cogs mesh into the cogs on the driving-pinon K.

L is a pulley on the reel-shaft.

M is a belt passing around these pulleys.

N is a lever pivoted on the foot-board O at $d$.

P is an anti-friction roller with its axis of motion working in the end of N. The use of this lever and roller is to tighten the belt M, and from the position of the lever N and driver's seat Q the driver, when seated on Q, by placing his foot on the end of N, can depress it, which will cause the roller P to press against the belt M and tighten it by making it assume the position shown in red lines or any one similar. The same may be accomplished by applying the hand instead of the foot, and when the hand or foot is removed from the lever N the belt M becomes slack, and thus the reel and rake are thrown out of gear at any time when the driver desires; and by means of the same the reel and rake may be brought into gear so gradually that it will not endanger the parts or render them liable to breakage or check the speed of the team.

R is a door, hinged to the rear of the platform S, having its center of motion at $h'$.

E is an arm or eye-piece on the lower corner of said door, next the master-wheel, and has a stud in it to receive the end of the cam-rod $f$. These are hinged or pivoted together by means of the stud in E and a hole in the end of $f$, which fits on said stud. The position of this stud in E is such that when the door R is operated by the cam-rod $f$ said stud passes the line $a'\,a'$ about equidistant both ways and passes over about a quarter of a circle, thus making it easily operated. Said line $a'\,a'$ is drawn at right angles to or perpendicular to the line of the cam-rod $f$, and is drawn from $h'$.

$g$ is a cam and pulley combined, and is fastened on the reel-shaft.

$h$ is the cam. The depression on its periphery permits the bar $i$, which is secured to the cam-rod $f$, to be moved back by the falling weight of the door R, which, from its inclined position, falls open by its own weight when not prevented. The passage of said bar $i$ from the greatest depression on the cam $h$ to the circular part closes said door by means of said bar $i$ and cam-rod $f$ acting on said stud-arm and door; and when said bar $i$ reaches the circular part of said cam, the peripheries of which and pulley J, forming part of $g$, coincide, the same can be shipped (by means of the driver's knee or hand applied to the knee-iron $m$, which is secured to the cam-rod $f$) onto the pulley J while the door is closed, and thus keep said door closed as long as desired, or until a sheaf is gathered on the platform, when the driver can again ship said bar $i$ onto the cam to open the door R.

$n$ is a piece of timber carrying the cone $o$, which operates the rake-latch $t$. This piece $n$ receives the eyes $p\,p$ on the cam-rod $f$, which permits said cam-rod to move back and forth on said piece $n$ while the door is being operated, and thus it will be seen that the same motion of the driver which causes the door to be operated causes the rake $q$ to be operated simultaneously with the door R, and thus the rake to discharge the sheaf and the door to permit it to be discharged are set in motion at the same time and by the same motion of the driver. The combination of the mechanism for operating the door R and rake $q$ are by no means dependent on each other further than their arrangement as a matter of convenience, each being an entirely separate invention and susceptible of being used separate and independent on different machines. It will be seen that by removing the cone $o$ the rake $q$ will cease to act, while the operation of the door R is perfect, and by the removal of the cam-rod $f$, iron $i$, and cam and pulley $g$ the door will cease to act, while the operation of the rake is perfect. The rake $q$ is connected to the arms $r\,r$ by loose or slack joints, as also the arms $r\,r$ to the reel-rod $s$, which drives them, so as to permit said rake to be governed or guided in its passage through the machine by the boarding of the sides of the grain-passage, without straining the reel when the machine is twisted.

T is the finger-piece, as shown in Fig. 4.

U is a metal rod passing through the divider just behind the finger-piece T and about in range with the top of T, thence passing down under the frame of the platform and rising at the other end, passing through the rear of the main frame C, thus passing down from the top of the finger-piece at the divider to near the bottom in the center and up above the top at the main frame, with a screw cut on each end, which receives nuts, so that by tightening said nuts said brace-rod U will elevate the center of said finger-piece T and take off any sag or prevent its sagging by means of the weight it has to sustain, as it is thus made self-supporting.

Having thus described my improvements, what I claim, and desire to secure by Letters Patent, is—

1. So arranging the mechanism of the automatically-operating door or shutter for preventing scattering and admitting the gavels to be discharged at regular intervals as to permit the attendant to increase the intervals of time for the discharge of the gavels where the grain is thin upon the ground, substantially as described.

2. The combination of the rake $q$ with the door or shutter R for discharging the gavel at the time the door or shutter is opened for the purpose, whether it is at regular intervals or less frequently, substantially as described.

ABNER WHITELEY.

Witnesses:
JOHN L. SMITH,
R. R. HUGHES.